United States Patent
Park et al.

(10) Patent No.: US 12,440,975 B2
(45) Date of Patent: Oct. 14, 2025

(54) METHOD FOR COMPENSATING FOR FRICTION OF MULTI-DEGREE-OF-FREEDOM COOPERATIVE ROBOT

(71) Applicant: NEUROMEKA, Seoul (KR)

(72) Inventors: Jong Hoon Park, Namyangju (KR); Woong Yong Lee, Pohang (KR); Young Jin Heo, Changwon (KR); Gwan Woo Kim, Pohang (KR)

(73) Assignee: NEUROMEKA, Seoul (KR)

( * ) Notice: Subject to any disclaimer, the term of this patent is extended or adjusted under 35 U.S.C. 154(b) by 239 days.

(21) Appl. No.: 17/629,279

(22) PCT Filed: Oct. 30, 2020

(86) PCT No.: PCT/KR2020/015022
§ 371 (c)(1),
(2) Date: Jan. 21, 2022

(87) PCT Pub. No.: WO2021/086106
PCT Pub. Date: May 6, 2021

(65) Prior Publication Data
US 2022/0410388 A1    Dec. 29, 2022

(30) Foreign Application Priority Data

Nov. 1, 2019 (KR) .................. 10-2019-0138394
Nov. 1, 2019 (KR) .................. 10-2020-0131103

(51) Int. Cl.
*B25J 9/16* (2006.01)
(52) U.S. Cl.
CPC .......... *B25J 9/1641* (2013.01); *B25J 9/1664* (2013.01); *B25J 9/1692* (2013.01)

(58) Field of Classification Search
CPC ...... B25J 9/1641; B25J 9/1664; B25J 9/1692; G05B 2219/37373; G05B 2219/39181
See application file for complete search history.

(56) References Cited

U.S. PATENT DOCUMENTS

| 11,648,681 B2 * | 5/2023 | Ju ..................... B25J 9/1607 |
| | | 700/245 |
| 11,691,285 B2 * | 7/2023 | Saadat Dehghan ........ B25J 9/12 |
| | | 700/245 |

(Continued)

FOREIGN PATENT DOCUMENTS

| CN | 109648549 A | * | 4/2019 | |
| CN | 111546315 B | * | 11/2022 | ............. B25J 17/02 |

(Continued)

OTHER PUBLICATIONS

CN-109648549-A translation (Year: 2019).*

(Continued)

*Primary Examiner* — Kyle T Johnson (57) ABSTRACT

In a method for compensating for friction of a multi-degree-of-freedom cooperative robot including a plurality of joints, the method for compensating for friction of the multi-degree-of-freedom cooperative robot, according to an embodiment of the present invention, comprises the steps of: generating a motion of a cooperative robot for friction compensation; driving the plurality of joints on the basis of the generated motion of the cooperative robot; receiving friction identification data from the cooperative robot; and calculating a friction model function from the received friction identification data.

9 Claims, 4 Drawing Sheets

(56) References Cited

U.S. PATENT DOCUMENTS

| | | | | |
|---|---|---|---|---|
| 2004/0093119 | A1* | 5/2004 | Gunnarsson | B25J 9/1638 700/245 |
| 2007/0142823 | A1* | 6/2007 | Prisco | B25J 9/1638 606/1 |
| 2010/0087955 | A1* | 4/2010 | Tsusaka | B25J 9/0003 700/245 |
| 2014/0202276 | A1* | 7/2014 | Song | B25J 17/00 74/490.05 |
| 2015/0248121 | A1* | 9/2015 | Nilsson | B25J 9/1641 318/569 |
| 2016/0365771 | A1* | 12/2016 | Kokubo | B25J 9/1641 |
| 2017/0080574 | A1* | 3/2017 | Kuroda | H04N 23/57 |
| 2017/0165834 | A1* | 6/2017 | Hares | B25J 9/126 |
| 2018/0263719 | A1* | 9/2018 | Choi | A61B 90/361 |
| 2018/0354135 | A1* | 12/2018 | Carlisle | B25J 9/1676 |
| 2019/0168383 | A1* | 6/2019 | Haddadin | B25J 9/163 |
| 2021/0291364 | A1* | 9/2021 | Li | G05B 17/02 |
| 2022/0410388 | A1* | 12/2022 | Park | B25J 9/1641 |

FOREIGN PATENT DOCUMENTS

| | | | | |
|---|---|---|---|---|
| KR | 101369286 | B1 | | 3/2014 |
| KR | 20150093039 | A | | 8/2015 |
| KR | 20150141246 | A | | 12/2015 |
| KR | 20170101775 | A | * | 9/2017 |
| KR | 20190029286 | A | | 3/2019 |
| KR | 20190032280 | A | | 3/2019 |
| KR | 102170591 | B1 | * | 10/2020 ............ B25J 9/1641 |
| WO | 2019/063146 | A1 | | 4/2019 |

OTHER PUBLICATIONS

CN-111546315-B translation (Year: 2022).*
KR-20170101775-A translation (Year: 2017).*
KR-102170591-B1 translation (Year: 2020).*
The Extended European Search Report for European Patent Application No. 20883155.2, dated Nov. 6, 2023.
M.R. Kermani et al., "Friction Identification in Robotic Manipulators: Case Studies," Proceedings of the 2005 IEEE Conference on Control Applications Toronto, Canada, Aug. 28-31, 2005.
Maged Iskandar et al., "Dynamic friction model with thermal and load dependency: modeling, compensation, and external force estimation," 2019 International Conference on Robotics and Automation (ICRA) Palais des congres de Montreal, Montreal, Canada, May 20-24, 2019.

* cited by examiner

METHOD FOR COMPENSATING FOR FRICTION OF MULTI-DEGREE-OF-FREEDOM COOPERATIVE ROBOT

BACKGROUND OF THE DISCLOSURE

Field of the Disclosure

The present disclosure relates to a method for compensating for friction of a multi-degree-of-freedom cooperative robot, and more particularly, to a method for compensating for a frictional force acting on a cooperative robot with multiple degrees of freedom.

Related Art

Recently, collaborative robots that can work in the same space as humans have emerged. Collaborative robots are robots that operate in close proximity to humans and are smaller and slower than conventional industrial robots for human safety.

The cooperative robot has the advantage that the operator can directly teach and use it as needed.

However, due to the large frictional force generated by the gear mechanism in each joint of the cooperative robot, the agile interaction between the user and the cooperative robot is hindered in a situation where the user directly moves the cooperative robot to teach.

In addition, even if the setting according to the friction force compensation is completed during the initial setting of the cooperative robot, the friction characteristics change due to wear of the drive system depending on the period of use of the cooperative robot. It often happens that the driving precision is poor.

SUMMARY

The present disclosure provides a friction compensation method for a multi-degree-of-freedom cooperative robot in which the cooperative robot can measure friction by itself, collect a large amount of friction force data, and derive a friction model without user intervention.

The problems of the present invention are not limited to the problems mentioned above, and other problems not mentioned will be clearly understood by those skilled in the art from the following description.

According to an exemplary embodiment of the present disclosure, a method for compensating for friction of a multi-degree-of-freedom cooperative robot including a plurality of joints may include steps of: generating motion of the cooperative robot for friction compensation; driving the plurality of joints on the basis of the generated motion of the cooperative robot; receiving friction identification data from the cooperative robot; and calculating a friction model function from the received friction identification data.

The step of generating motion of the cooperative robot may include the step of generating a posture in which the effect of gravity is removed.

The step of generating motion of the cooperative robot may include the step of generating a motion for removing an inertial effect.

The step of generating motion of the cooperative robot may include the step of generating a motion for controlling the effect of a Coriolis force.

The friction identification data may include angle information of a plurality of joints, torque-related information acting on the plurality of joints, and temperature information of an actuator that drives the plurality of joints.

The step of calculating a friction model function may include the step of identifying static friction, kinetic friction, and viscous friction acting on the plurality of joints based on the friction identification data.

The method may include the step of: using real-time data of the friction identification data to identify the static friction and the kinetic friction; and using average data of the friction identification data to identify the viscous friction.

The variable of the friction model function may include a driving speed of the plurality of joints.

The friction identification data may include temperature information of an actuator that drives the plurality of joints, and the variable of the friction model function further comprises the temperature information.

The method may further include the steps of: driving the plurality of joints by applying the calculated friction model function; and evaluating the friction model function based on the position error of the cooperative robot.

The method may include the step of compensating the parameters of the friction model function based on the result of the step of evaluating the friction model function.

The method may further include correcting a parameter of the friction model function based on a result of the step of evaluating the friction model function.

Other specific details of the invention are included in the detailed description and drawings.

According to the embodiments of the present invention, there are at least the following effects.

Without user intervention, the collaborative robot measures friction by itself, collects a large amount of friction data, and derives a friction model.

In addition, since the friction model is automatically calculated and then the friction force is calculated and compensated by itself, agile direct teaching and force control performance can be maintained regardless of the period of use of the cooperative robot.

The effect according to the present invention is not limited by the contents exemplified above, and more various effects are included in the present specification.

DESCRIPTION OF EXEMPLARY EMBODIMENTS

Advantages and features of the present invention and methods of achieving them will become apparent with reference to the embodiments described below in detail in conjunction with the accompanying drawings. However, the present invention is not limited to the embodiments disclosed below, but may be implemented in various different forms, and only these embodiments are provided so that the disclosure of the present invention is complete, and to completely inform those of ordinary skill in the art to which the present invention belongs, the scope of the invention, and the present invention is only defined by the scope of the claims.

Further, the embodiments described herein will be described with reference to cross-sectional and/or schematic diagrams that are ideal illustrative views of the present invention. Accordingly, the shape of the illustrative drawing may be modified due to manufacturing technology and/or tolerance. In addition, in each of the drawings shown in the present invention, each component may be enlarged or reduced to some extent in consideration of convenience of description. The same reference numerals refer to the same component throughout the specification.

Hereinafter, the present invention will be described with reference to the drawings for explaining a friction compensation system for a multi-degree-of-freedom cooperative robot and a friction compensation method for a multi-degree-of-freedom cooperative robot according to an embodiment of the present invention.

Figure 1:
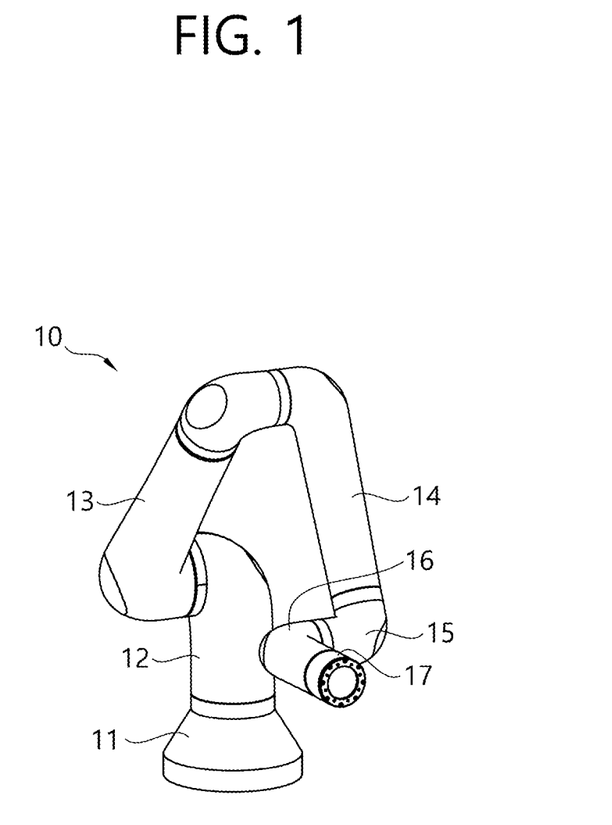
FIG. 1 is a perspective view illustrating a multi-degree-of-freedom cooperative robot.

FIG. 1 is a perspective view illustrating a multi-degree-of-freedom cooperative robot.

The cooperative robot 10 includes a plurality of joints 12, 13, 14, 15, 16, and 17 to realize movement of multiple degrees of freedom. FIG. 1 illustrates a cooperative robot 10 configured to have six degrees of freedom using six joints 12, 13, 14, 15, 16, and 17 as an example of a multi-degree-of-freedom cooperative robot.

The first joint 12 is rotatably coupled to the upper portion of the base 11, and the first joint 12 rotates about the Z axis (vertical direction with respect to FIG. 1). One end surface (surface facing the base 11) and the other end surface (surface facing the second joint 13) of the first joint 12 are located on a plane perpendicular to each other.

The second joint 13 is rotatably coupled to the other end of the first joint 12. Since one end face and the other end face of the first joint 12 are positioned on a plane perpendicular to each other, the second joint 13 rotates about an axis in a direction perpendicular to the axis of rotation of the first joint 12. One end surface (surface facing the first joint 12) and the other end surface (surface facing the third joint 14) of the second joint 13 are located on a plane that is parallel or coincident with each other.

The third joint 14 is rotatably coupled to the other end of the second joint 13. Since the one end face and the other end face of the second joint 13 are located on a plane that is parallel or coincident with each other, the third joint 14 rotates about an axis parallel to the axis of rotation of the second joint 13. One end surface (surface facing the second joint 13) and the other end surface (surface facing the fourth joint 15) of the third joint 14 are located on a plane perpendicular to each other.

The fourth joint 15 is rotatably coupled to the other end of the third joint 14. Since one end face and the other end face of the third joint 14 are positioned on a plane perpendicular to each other, the fourth joint 15 rotates about an axis in a direction perpendicular to the axis of rotation of the third joint 14. One end face (the face facing the third joint 14) and the other end face (the face facing the fifth joint 16) of the fourth joint 15 are located on a plane perpendicular to each other.

The fifth joint 16 is rotatably coupled to the other end of the fourth joint 15. Since the one end face and the other end face of the fourth joint 15 are positioned on a plane perpendicular to each other, the fifth joint 16 rotates about an axis in a direction perpendicular to the axis of rotation of the fourth joint 15. One end face (surface facing the fourth joint 15) and the other end face (surface facing the sixth joint 17) of the fifth joint 16 are located on a plane perpendicular to each other.

The sixth joint 17 is rotatably coupled to the other end of the fifth joint 16. Since the one end face and the other end face of the fifth joint 16 are located on a plane perpendicular to each other, the sixth joint 17 rotates about an axis in a direction perpendicular to the axis of rotation of the fifth joint 16. One end face (the face facing the fourth joint 15) and the other end face of the fifth joint 16 are located on a plane perpendicular to each other.

An end tool (not shown) is mounted on the other end of the sixth joint 17. Various types of end tools exist depending on the work performed by the cooperative robot 10, and the other end of the sixth joint 17 is configured to replace and mount various end tools.

Each joint 12, 13, 14, 15, 16, and 17 is provided with an actuator (not shown) for rotationally driving the joints 12, 13, 14, 15, 16, and 17.

In order to improve and maintain the driving precision and ease of use of the cooperative robot 10, it is necessary to identify the friction force acting on each joint 12, 13, 14, 15, 16, 17, etc. of the cooperative robot 10 and control the friction force compensation to control the actuator in consideration of the torque lost by the friction force.

Figure 2:
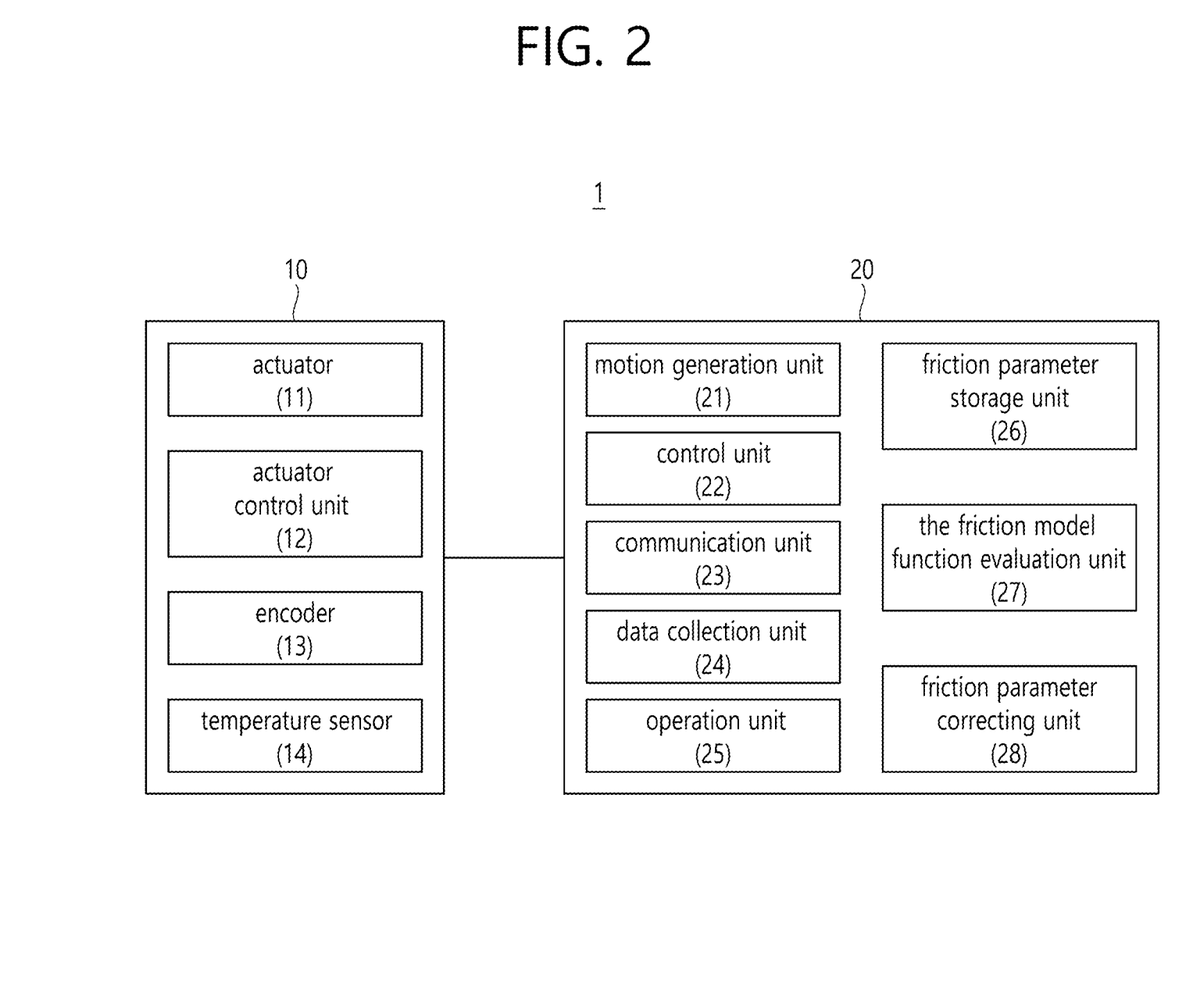
FIG. 2 is a block diagram schematically illustrating a friction compensation system of a multi-degree-of-freedom cooperative robot according to an embodiment of the present invention.

FIG. 2 is a block diagram schematically illustrating a friction compensation system of a multi-degree-of-freedom cooperative robot according to an embodiment of the present invention.

As shown in FIG. 2, a friction compensation system 1 of a multi-degree-of-freedom cooperative robot according to an embodiment of the present invention includes a multi-degree-of-freedom cooperative robot 10 and a robot controller 20.

The cooperative robot 10 includes an actuator 11, an actuator control unit 12, an encoder 13, and a temperature sensor 14.

As described above, the actuator 11 is a driving source for rotationally driving the joints 12, 13, 14, 15, 16, and 17 of the cooperative robot 10. The actuator control unit 12 may measure the current value supplied to the actuator 11, and calculate the driving speed, position, etc. of the joints 12, 13, 14, 15, 16, and 17. The temperature sensor 14 measures the temperature of the actuator 11. The encoder 13 measures the angles of the joints 12, 13, 14, 15, 16, and 17.

The actuator 11, the actuator control unit 12, the encoder 1, and the temperature sensor 14 may be provided for each joint 12, 13, 14, 15, 16, and 17 of the cooperative robot 10.

The robot control unit 20 is communicatively connected to the cooperative robot 10, and includes the motion generating unit 21, the control unit 22, the communication unit 23, the data collection unit 24, the operation unit 25, the friction parameter storage unit 26, the friction model function evaluation unit 27, and the friction parameter correcting unit 28.

The motion generating unit 21 generates a motion required for the cooperative robot 10 in order to derive the frictional force of the cooperative robot 10.

The controller 22 is responsible for controlling the cooperative robot 10. The control unit 22 may control the actuator 11 of the cooperative robot 10 and perform strong position control on the cooperative robot 10 so that the cooperative robot 10 accurately complies with the motion trajectory of the cooperative robot 10 generated by the motion generation unit 21.

The communication unit 23 manages communication between the robot control unit 20 and the cooperative robot 10. The communication unit 23 may be based on Ethernet communication, and transmits a control command from the robot control unit 20 to the cooperative robot 10, and the cooperative robot 10 from the cooperative robot 10 to the robot control unit 20 and transmits information necessary for controlling the cooperative robot 10 from the cooperative robot 10 to the robot control unit 20. In addition, friction identification data including angle information of a plurality of joints, torque-related information, and temperature information of an actuator may be transmitted from the cooperative robot 10 to the robot controller 20.

The data collection unit 24 collects and classifies data related to the cooperative robot 10 (particularly, friction identification data) transmitted from the communication unit 23.

The operation unit 25 provides additional information (for example, speed information, position information, torque information, average value for specific information, etc.) can be calculated.

In addition, the operation unit 25 may identify static friction, kinetic friction, and viscous friction acting on a plurality of joints based on the data collected/classified by the data collection unit 24.

In addition, the operation unit 25 may calculate a friction model function based on the data collected/classified by the data collection unit 24.

The friction parameter storage unit 26 stores the friction model function or parameters of the friction model function calculated by the operation unit 25.

The friction model function evaluation unit 27 evaluates the appropriateness of the friction model function calculated by the operation unit 25, and the friction parameter correction unit 28 corrects the parameters of the friction model function when the friction model function evaluation unit 27 evaluates that the friction model function is not appropriate.

The components of the robot control unit 20 are the motion generation unit 21, the control unit 22, the communication unit 23, the data collection unit 24, the operation unit 25, the friction parameter storage unit 26, the friction model function evaluation unit 27, and the friction parameter correcting unit 28, and they will be described in detail in the description of the friction compensation method of the multi-degree-of-freedom cooperative robot to be described later.

The components of the robot control unit 20 are the motion generation unit 21, the control unit 22, the communication unit 23, the data collection unit 24, the operation unit 25, the friction parameter storage unit 26, the friction model function evaluation unit 27, the friction parameter correcting unit 28, and they are classified based on functions, a plurality of components may be integrated into one physical part and in an actual physical configuration. For example, the functions of the operation unit 25, the friction model function evaluation unit 27, and the friction parameter correcting unit 28 may be performed in one calculation device.

Figure 3:
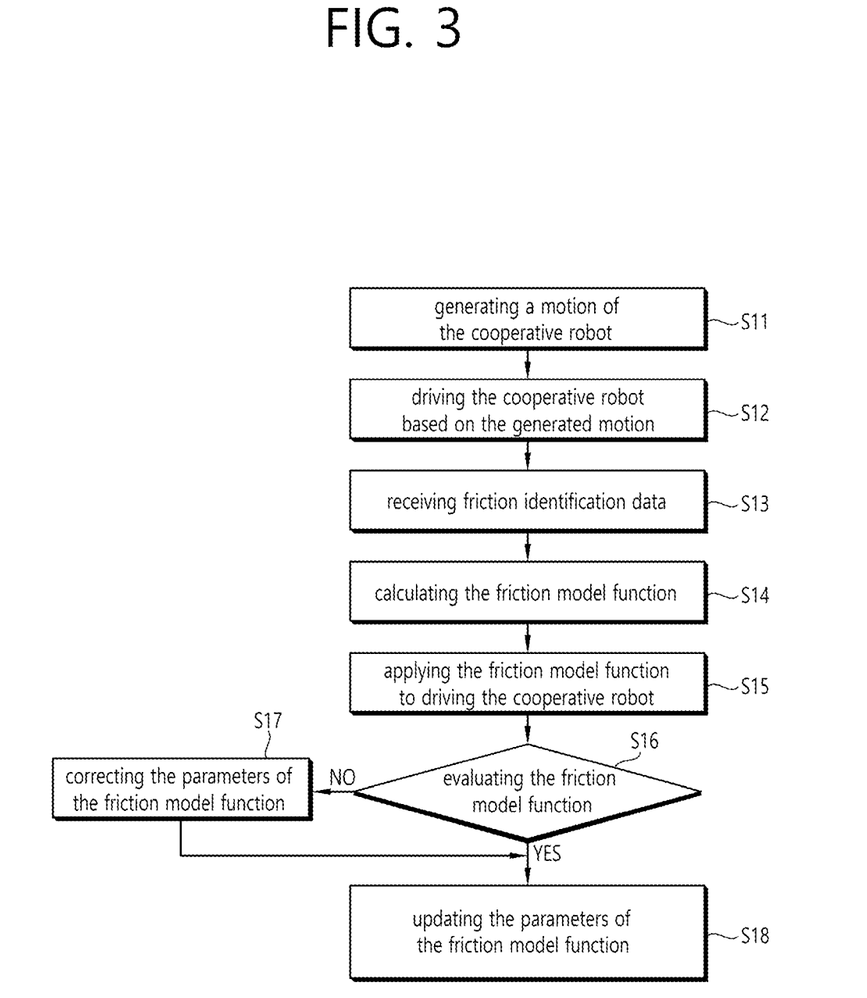
FIG. 3 is a flowchart illustrating a friction compensation method of a multi-degree-of-freedom cooperative robot according to an embodiment of the present invention.

FIG. 3 is a flowchart illustrating a friction compensation method of a multi-degree-of-freedom cooperative robot according to an embodiment of the present invention.

As shown in FIG. 3, a friction compensation method for a multi-degree-of-freedom cooperative robot according to an embodiment of the present invention includes generating a motion of the cooperative robot S11, and driving the cooperative robot based on the generated motion S12, receiving friction identification data S13, calculating the friction model function S14, applying the friction model function to driving the cooperative robot S15, evaluating the friction model function S16, correcting the parameters of the friction model function S17, and updating the parameters of the friction model function S18.

In step S11 of generating the motion of the cooperative robot, the motion generating unit 21 generates the motion of the cooperative robot 10 for friction compensation.

The motion generating unit 21 generates the motion of the cooperative robot 10 based on the following robot dynamics equation (Formula 1) so that the cooperative robot 10 can measure friction by itself without user intervention.

$$M(q)\ddot{q}+C(q,\dot{q})\dot{q}+g(q)=\tau+\tau_f \qquad \text{[Formula 1]}$$

$q$, $\dot{q}$, $\ddot{q}$ represents the rotation position, rotation speed, and rotation angular velocity of the robot 10, respectively. In addition, $M(q)\ddot{q}$ is the inertial force of the robot 10, $C(q,\dot{q})\dot{q}$ is the Coriolis force, $g(q)$ represents gravity, and $\tau$, $\tau_f$ represents the torque value input to the robot 10 and the frictional force acting on the robot 10, respectively.

The motion generating unit 21 generates a robot motion capable of removing the effects of the inertial force, the Coriolis force, and gravity so that the robot 10 can measure the friction force by itself as the torque input value $\tau$.

First, a gravity-compensated motion capable of eliminating the effect of gravity will be described.

The motion generating unit 21 sets the posture of the cooperative robot 10 so that the joints 12, 13, 14, 15, 16, and 17 for which frictional force is to be measured are not affected by gravity. In this case, the overall posture of the cooperative robot 10 may be in a direction parallel to the direction in which gravity acts. For example, the rotation axis of each joint may be positioned parallel to the direction in which gravity acts to exclude the effect of gravity acting on each joint. However, a gravity compensation motion for a joint in which the axis of rotation cannot be parallel to gravity, such as the second joint 13 among the joints 12, 13, 14, 15, 16, and 17, will be described later.

When described with reference to the cooperative robot 10 shown in FIG. 1, In the case of the first joint 12, the third joint 14, the fourth joint 15, and the sixth joint 17, all joints 12, 13, 14, 15, 16, and 17 have an angle of 0 degrees and measure the friction force in that posture.

In the case of the fifth joint 16, the first joint 12, the second joint 13, the fifth joint 16, and the sixth joint 17 have an angle of 0 degrees, and the third joint 14 and the fourth joint 15 measures the friction force in a posture having an angle of 90 degrees.

On the other hand, for joints that are inevitably affected by gravity in any posture, a symmetrical motion that can cancel the effect of gravity is created and frictional force is measured.

For example, the second joint 13 measures frictional force through a motion changing from 0 degrees to 90 degrees and a motion changing from 90 degrees to 0 degrees.

An inertia-compensated motion that can remove the inertial effect will be described.

The motion generating unit 21 generates the motion of the cooperative robot 10 so that the joints 12, 13, 14, 15, 16, and 17 for which frictional force is to be measured are not affected by inertia.

For example, the motion generation unit 21 may generate a position trajectory in which a linear trajectory and a parabolic trajectory are mixed to generate a robot motion including a linear velocity trajectory and a constant velocity trajectory. That is, the motion generating unit 21 continuously generates a motion including a constant velocity section that is not affected by the inertial force generated by the acceleration of each joint 12, 13, 14, 15, 16, and 17, thereby removing the influence of inertia acting on the joint 12, 13, 14, 15, 16, and 17.

A Coriolis force compensation motion that can eliminate the Coriolis force effect will be described.

The motion generating unit 21 establishes a motion plan of the cooperative robot 10 so that the joints 12, 13, 14, 15, 16, 17 for which frictional force is to be measured are not affected by the Coriolis force.

For example, the motion generation unit 21 may generate a motion for sequentially driving each joint 12, 13, 14, 15, 16, 17 in order to remove the Coriolis force generated by the nonlinear multi-degree-of-freedom robot motion.

Also, the motion generation unit 21 may generate a speed-based step-by-step motion to improve the accuracy of friction force measurement. The speed-based step-by-step motion increases the speed in steps of 0.05 degrees/sec until a speed of 1 degree/sec is reached in the first step, the speed in steps of 1 degree/sec until a speed of 10 degree/sec is reached in the second step, and the speed in steps of 10 degrees/sec until the maximum speed is reached in the third step.

In step S12 of driving the cooperative robot based on the generated motion, the controller 22 drives the cooperative robot 10 according to the motion generated by the motion generating unit 21 in step S11.

In order to precisely drive the cooperative robot 10 according to the motion, the control unit 22 may be configured to implement high-speed real-time control of a 4 kHz control cycle based on Ethernet communication.

In addition, the control unit 22 may improve the driving precision of the cooperative robot 10 through real-time robust position control. For example, the controller 22 may control each joint 12, 13, 14, 15, and 17 of the cooperative robot 10 by combining the robot model-based front feed control method and the robot state variable-based feedback control method.

In step S13 of receiving the friction identification data, the communication unit 23 receives the friction identification data from the cooperative robot 10, and the data collection unit 24 collects and classifies the friction identification data from the communication unit 23. The reception of friction identification data may be made together with step S12, and friction identification data of each joint 12, 13, 14, 15, 16, and 17 is received.

The actuator control unit 12 of the cooperative robot 10 obtains information on the current value supplied to the actuator 11, information on the angle of each joint 12, 13, 14, 15, 16, and 17 obtained from the encoder 13, and information about the temperature of the actuator 11 obtained from the temperature sensor 14 is transmitted to the robot control unit 20.

The actuator control unit 12 acts on the position, speed, and torque of the joints 12, 13, 14, 15, 16, 17 based on the information obtained from the encoder 13 and the current value supplied to the actuator 11, etc. It is also possible to calculate the torque, etc., and transmit the calculation result to the robot control unit 20.

According to the embodiment, the cooperative robot 10 further includes a torque sensor (not shown) for measuring the torque acting on each joint 12, 13, 14, 15, 16, 17, and torque information output from the torque sensor may be transmitted to the robot control unit 20.

The friction identification data is data used to identify the friction force acting on each joint 12, 13, 14, 15, 16, and 17, which may include the angle information of the joint 12, 13, 14, 15, 16, and 17 measured by the encoder 13, the current value supplied to the actuator measured by the actuator control unit 12, temperature information of the actuator 11 measured by the temperature sensor 14, and position information and velocity information of the joint 12, 13, 14, 15, 16, 17 computed by the actuator control unit 12. In this case, since the current value supplied to the actuator is proportional to the torque required to operate the joint 12, 13, 14, 15, 16, and 17, the current value supplied to the actuator becomes torque-related information for estimating the torque acting on the joint 12, 13, 14, 15, 16, and 17. When the cooperative robot 10 is provided with a torque sensor, the measured value of the torque sensor becomes torque-related information.

The operation unit 25 provides additional information (for example, speed information, position information, torque information, an average value of specific information, etc.) may be calculated and transmitted to the data collection unit 24.

The data collection unit 24 may collect and store the average value and real-time data of friction identification data for each joint 12, 13, 14, 15, 16, 17 according to the speed-based step-by-step motion.

One motion unit may consist of a stop, a clockwise rotation, a stop, a counterclockwise rotation, and a stop. Alternatively, one motion unit may consist of a stop, a counterclockwise rotation, a stop, a clockwise rotation, and a stop. In addition, the clockwise rotation and the counterclockwise rotation may consist of a linear speed section and a constant speed section. In a certain speed section, the average data of friction identification data may be stored, and in a motion of a specific speed, real-time data of friction identification data may be collected and stored.

In the step of calculating the friction model function S14, the operation unit 25 may calculate the friction model function based on the data collected/classified by the data collection unit 24.

To this end, the operation unit 25 may identify static friction, kinetic friction, and viscous friction acting on each joint 12, 13, 14, 15, 16, 17 based on the data collected/classified by the data collection unit 24.

For example, the operation unit 25 may use real-time data of friction identification data to identify static friction and kinetic friction. Static friction can be identified using the maximum torque value that appears when the joint 12, 13, 14, 15, 16, and 17 starts moving, and kinetic friction can be identified using the torque value that appears in the low-speed section after the joint 12, 13, 14, 15, 16, and 17 starts moving.

Also, the operation unit 25 may use average data (average torque related information) of friction identification data to identify viscous friction.

The operation unit 25 may identify a friction model function of a joint expressing static friction, kinetic friction, and viscous friction. The form of the friction model function may be predefined. The operation unit 25 may identify the constant value of the friction model function by data fitting using the least squares method.

For example, the operation unit 25 derives a friction model function ($f(x)=ax^2+bx+c$) of a quadratic function based on the derived data, and three friction parameters (a, b and c) can be calculated. The variable (x) of the friction model function may be the driving speed of the joint.

The operation unit 25 may store or update the calculated friction model function or friction parameter in the friction parameter storage unit 26.

In the step S15 of driving the cooperative robot by applying the friction model function, the control unit 22 applies the friction model function calculated by the operation unit 25 to each joint 12, 13, 14, 15, 16, and 17 of the cooperative robot 10 are driven. When the operation unit 25 stores the calculated friction model function or friction parameter in the friction parameter storage unit 26, the control unit 22 applies the newly updated friction model function or friction parameter to the friction parameter storage unit 26. The cooperative robot 10 is driven.

The controller 22 calculates the friction compensation force in real time by applying the parameters of the calculated friction model function. The control unit 22 receives the real-time speed and temperature values obtained through the communication unit 23 based on the following [Formula 2], calculates a friction compensation torque value, and based on this, the joints 12, 13, 14, 15, 16, and 17 can be controlled.

$$\hat{\tau}_f = f(\dot{q}, T) \quad \text{[Formula 2]}$$

f( ) represents the nonlinear friction model, and $\hat{\tau}_f$, $\dot{q}$, T represents the calculated friction force, joint velocity, and temperature, respectively. The method according to an embodiment of the present invention may utilize the following modified Lu-Gre friction model.

$$\hat{\tau}_f = \sigma_0 z + \sigma_1(q)\frac{dz}{dt} + \tau_v(T)$$

$$\frac{dz}{dt} = \dot{q} - \frac{|\dot{q}|}{g(\dot{q}, T, L)} z$$

$$g(\dot{q}, T, L) = \frac{1}{\sigma_0}\left(F_c(T, L) + \left(F_s - F_c(T, L)e^{-\left(\frac{\dot{q}}{q_s}\right)^2}\right)\right)$$

$$\tau_v(\dot{q}) = \begin{cases} (\sigma_{2o,p} + \sigma_{2T,p}T)\left(1 - e^{-\left|\frac{\dot{q}}{\sigma_{3o,p} + \sigma_{3T,p}T}\right|}\right) & \dot{q} > 0 \\ (\sigma_{2o,n} + \sigma_{2T,n}T)\left(1 - e^{-\left|\frac{\dot{q}}{\sigma_{3o,n} + \sigma_{3T,n}T}\right|}\right) & \dot{q} < 0 \end{cases}$$

σ0, σ1 represent the stiffness constant and damping constant, respectively, Fc, Fs represent static friction and kinetic friction, σ2o,{p,n}, σ2T,{p,n}, σ3o,{p,n}, σ3T,{p,n} represents the viscous friction constant values. qs is the velocity constant value, and T and L are the temperature and the weight attached to the cooperative robot, respectively.

In the step of evaluating the friction model function S16, the friction model function evaluation unit 27 evaluates the friction compensation performance of the friction model function based on the passivity and position error of the cooperative robot 10.

If the evaluation result is less than a predetermined criterion, a step S17 of correcting the parameters of the friction model function is performed.

In step S17 of correcting the parameters of the friction model function, the friction parameter correcting unit 28 adjusts the parameters of the friction model function. A rule for adjusting a parameter of the friction model function may be predefined. For example, the friction parameter correcting unit 28 may determine the adjustment range of the parameter of the friction model function based on the result of the position error measured in step S16.

In step S18 of updating the parameters of the friction model function, the friction parameter storage unit 26 stores the friction model function (or friction parameter) determined to be appropriate in step S16 or the friction model function whose parameters are corrected in step S17 (or corrected friction parameters) can be stored.

Then, the control unit 22 can use the positive feedback control method to use the frictional force ($\hat{\tau}_f$) to compensate the frictional force effect in the direct teaching and force control mode of the cooperative robot 10.

For example, when the user moves the cooperative robot 10 in a situation where the user directly teaches, torque corresponding to the frictional force is applied to the joints, so that the user can move each joint of the cooperative robot 10 in a state similar to that almost no frictional force acts on each joint 12, 13, 14, 15, 16, and 17 in the cooperative robot 10.

In addition, according to the period of use of the cooperative robot 10, the friction characteristics change due to wear of the drive system, etc., even after completing the setting according to the friction force compensation during the initial setting of the cooperative robot 10, and the driving precision or ease of use of the cooperative robot 10 is often poor as the usage period of the cooperative robot 10 increases, according to the friction compensation system for a multi-degree-of-freedom cooperative robot and a friction compensation method for a multi-degree-of-freedom cooperative robot according to an embodiment of the present invention. According to the system for compensating for friction of multi-degree-of-freedom cooperative robot and the method for compensating for friction of multi-degree-of-freedom cooperative robot according to an embodiment of the present invention, since the friction compensation function (or friction parameter) of the cooperative robot 10 can be newly updated at any time, the driving precision and ease of use of the cooperative robot 10 can be continuously maintained.

Figure 4:
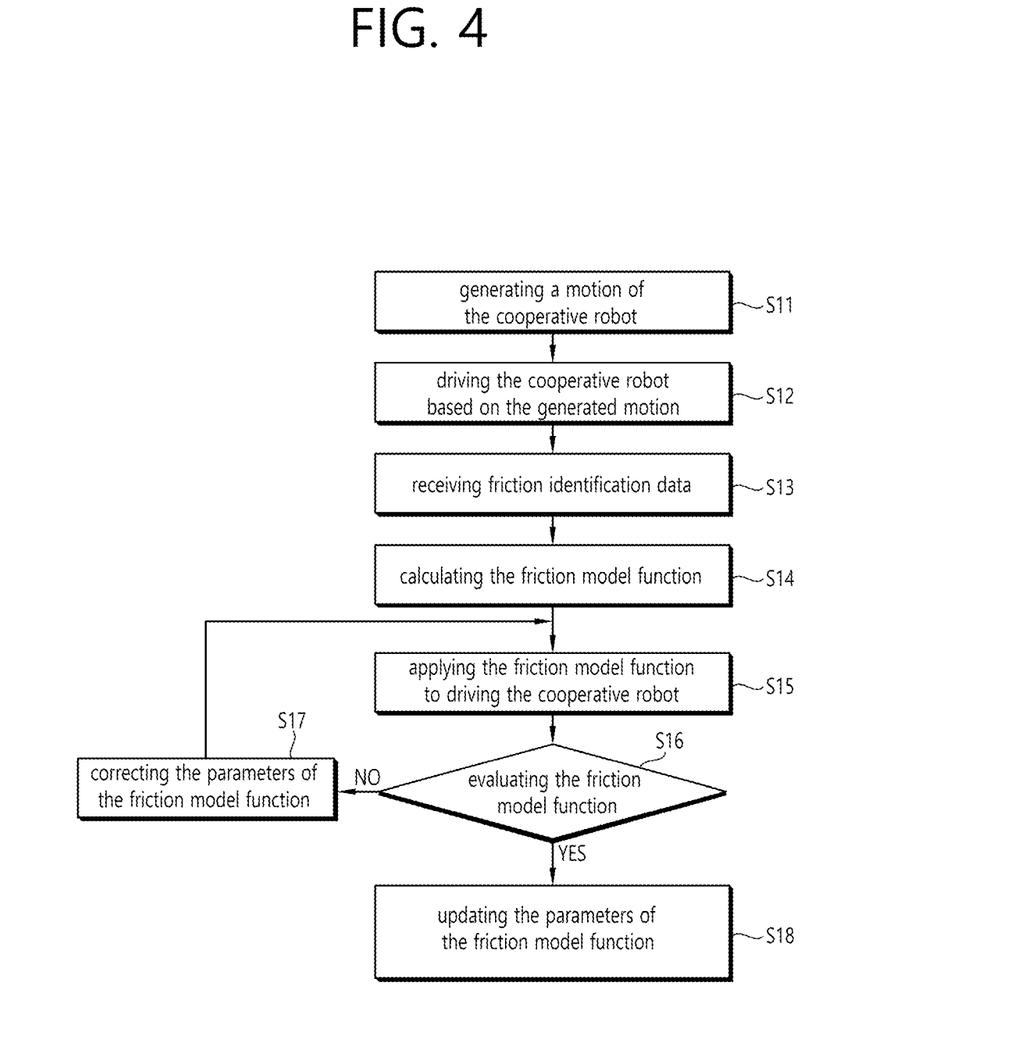
FIG. 4 is a flowchart illustrating a friction compensation method of a multi-degree-of-freedom cooperative robot according to another embodiment of the present invention.

FIG. 4 is a flowchart illustrating the method for compensating for friction of multi-degree-of-freedom cooperative robot according to another embodiment of the present invention.

The friction compensation method of the multiple degree of freedom cooperative robot according to another embodiment of the present invention is the same as the method for compensating for friction of multi-degree-of-freedom cooperative robot shown in FIG. 3 and the steps S11 to S18 are the same.

However, as shown in FIG. 4, in the method for compensating for friction of multi-degree-of-freedom cooperative robot according to another embodiment of the present invention, the friction parameter correction unit 28 adjusts the constant value of the friction model function in the step S17 of correcting the parameters of the friction model function, and proceeds to the step S15 of driving the cooperative robot by applying the friction model function again.

Accordingly, in step S15, the control unit 22 drives each joint 12, 13, 14, 15, 16, 17 of the cooperative robot 10 by applying the friction model function with the new constant value adjusted, and in step S16, the adequacy of the friction model function whose constant value is adjusted is determined based on the result. If the evaluation result of the friction model function in step S16 is less than a certain standard again, steps S15 and S16 are performed after step S17 is performed again, and these operations are repeated until the evaluation result of the friction model function whose constant value is adjusted exceeds a certain standard.

If it is determined in step S16 that the evaluation result of the friction model function is equal to or greater than a predetermined criterion, the process proceeds to step S18 and the friction parameter storage unit 26 finally stores the friction model function (or friction parameter).

Those of ordinary skill in the art to which the present invention pertains will understand that the present invention may be embodied in other specific forms without changing the technical spirit or essential features thereof. Therefore, it should be understood that the embodiments described above are illustrative in all respects and not restrictive. The scope of the present invention is indicated by the following claims rather than the above detailed description, and all changes or modifications derived from the meaning and scope of the claims and their equivalents should be construed as being included in the scope of the present invention.

What is claimed is:

1. A method for compensating for friction of a multi-degree-of-freedom cooperative robot including a plurality of joints, the method for compensating for friction of multi-degree-of-freedom cooperative robot comprising steps of:
   generating motion of the cooperative robot for friction compensation;
   driving the plurality of joints on the basis of the generated motion of the cooperative robot;
   receiving friction identification data from the cooperative robot; and
   calculating a friction model function from the received friction identification data,
   wherein the step of generating motion of the cooperative robot comprises the step of generating a posture in which the effect of gravity is removed and the step of generating a motion for removing an inertial effect, and
   in the posture in which the effect of gravity is removed, rotation axes of some of the plurality of joints are parallel to the direction of gravity, and others of the plurality of joints operate in symmetrical motion to cancel the effect of gravity.

2. The method according to claim 1, wherein the step of generating motion of the cooperative robot further comprises the step of generating a motion for controlling the effect of a Coriolis force.

3. The method according to claim 1, wherein the friction identification data comprises angle information of the plurality of joints, torque-related information acting on the plurality of joints, and temperature information of an actuator that drives the plurality of joints.

4. The method according to claim 1, wherein the step of calculating a friction model function comprises the step of identifying static friction, kinetic friction, and viscous friction acting on the plurality of joints based on the friction identification data.

5. The method according to claim 4, wherein the method comprises the step of:
   using real-time data of the friction identification data to identify the static friction and the kinetic friction; and
   using average data of the friction identification data to identify the viscous friction.

6. The method according to claim 1, wherein a variable of the friction model function comprises a driving speed of the plurality of joints.

7. The method according to claim 6,
   wherein the friction identification data comprises temperature information of an actuator that drives the plurality of joints, and
   wherein the variable of the friction model function further comprises the temperature information.

8. The method according to claim 1, wherein the method further comprises the steps of:
   driving the plurality of joints by applying the calculated friction model function; and
   evaluating the friction model function based on position error of the cooperative robot.

9. The method according to claim 8, wherein the method comprises the step of compensating parameters of the friction model function based on a result of the step of evaluating the friction model function.

* * * * *